US011341125B2

(12) United States Patent
Breen et al.

(10) Patent No.: US 11,341,125 B2
(45) Date of Patent: May 24, 2022

(54) METHODS AND SYSTEM FOR COLLECTION VIEW UPDATE HANDLING USING A DIFFABLE DATA SOURCE

(71) Applicant: Apple Inc., Cupertino, CA (US)

(72) Inventors: Stephen R. Breen, San Jose, CA (US); Scott C. Perry, Morgan Hill, CA (US)

(73) Assignee: Apple Inc.

( * ) Notice: Subject to any disclaimer, the term of this patent is extended or adjusted under 35 U.S.C. 154(b) by 0 days.

(21) Appl. No.: 16/724,056

(22) Filed: Dec. 20, 2019

(65) Prior Publication Data

US 2020/0379984 A1    Dec. 3, 2020

Related U.S. Application Data

(60) Provisional application No. 62/855,983, filed on Jun. 1, 2019.

(51) Int. Cl.
*G06F 17/00* (2019.01)
*G06F 16/23* (2019.01)
*G06F 16/21* (2019.01)
*G06F 16/248* (2019.01)

(52) U.S. Cl.
CPC ........ *G06F 16/2393* (2019.01); *G06F 16/219* (2019.01); *G06F 16/248* (2019.01)

(58) Field of Classification Search
CPC .. G06F 16/2393; G06F 16/219; G06F 16/248; G06F 40/166; G06F 40/197; G06F 3/04847; G06F 40/194; G06F 40/143; G06F 16/957
USPC ........................................................ 715/200
See application file for complete search history.

(56) References Cited

U.S. PATENT DOCUMENTS

| 6,842,176 | B2 | 1/2005 | Sang'udi et al. |
| 10,156,455 | B2 | 12/2018 | Bennett et al. |
| 10,169,890 | B1 | 1/2019 | Bakshi et al. |
| 2005/0050044 | A1* | 3/2005 | Takagi ................ G06F 16/9577 |
| 2006/0242570 | A1* | 10/2006 | Croft ...................... G06Q 10/10 |
| | | | 715/202 |
| 2008/0120368 | A1* | 5/2008 | Gale ..................... G06F 40/194 |
| | | | 709/203 |

(Continued)

OTHER PUBLICATIONS

Myers, Eugene W. "An O(ND) Difference Algorithm and its Variations", Department of Computer Science, University of Arizona, Tuscon, AZ 85721; 1986 pp. 1-15 (http://www.xmailserver.org/diff2.pdf).

*Primary Examiner* — Jason T Edwards
(74) *Attorney, Agent, or Firm* — Dickinson Wright RLLP

(57) ABSTRACT

This application relates to updating collection views in a computing device. A method includes receiving a first data array of a current view of a data collection and receiving a second data array of a future view of the data collection. The method also includes generating a difference data array that, based on a determination that the first data array element is equal to the second data array element, includes the second data array element. The method also includes, based on whether the first data array element is not included in the second data array and/or the second data array element is not included in the first data array, indicating, in the difference data array, that the first data array element is not in the future view or that the second data array element is not in the current view.

20 Claims, 4 Drawing Sheets

(56) References Cited

U.S. PATENT DOCUMENTS

| | | | |
|---|---|---|---|
| 2011/0197121 A1* | 8/2011 | Kletter | G06F 40/166 |
| | | | 715/234 |
| 2012/0233137 A1* | 9/2012 | Jakobson | G06F 40/197 |
| | | | 707/695 |
| 2013/0076757 A1* | 3/2013 | Pritting | G06T 13/00 |
| | | | 345/473 |
| 2015/0082235 A1* | 3/2015 | Volchok | G06F 16/00 |
| | | | 715/781 |
| 2015/0193399 A1* | 7/2015 | Woker | H04L 41/02 |
| | | | 715/234 |
| 2015/0269146 A1* | 9/2015 | Ayyar | G06Q 10/101 |
| | | | 707/608 |
| 2016/0070813 A1* | 3/2016 | Unter Ecker | G06F 16/958 |
| | | | 715/234 |
| 2017/0154089 A1 | 6/2017 | Sherman | |
| 2018/0121068 A1 | 5/2018 | Stewart | |
| 2019/0213241 A1* | 7/2019 | Ying | G06F 40/154 |
| 2019/0392057 A1* | 12/2019 | Denoue | G06K 9/00483 |

* cited by examiner

METHODS AND SYSTEM FOR COLLECTION VIEW UPDATE HANDLING USING A DIFFABLE DATA SOURCE

CROSS-REFERENCE TO RELATED APPLICATIONS

The present application claims the benefit of U.S. Provisional Application No. 62/855,983, entitled "METHODS AND SYSTEM FOR COLLECTION VIEW UPDATE HANDLING USING A DIFFABLE DATA SOURCE," filed Jun. 1, 2019, the content of which is incorporated herein by reference in its entirety for all purposes.

FIELD

The described embodiments set forth techniques for updating a collection view on a computing device using a diffable data source.

BACKGROUND

Recent years have shown a proliferation in the number of individuals who own and operate computing devices (e.g., smartphones and tablets). Typically, an individual uses his or her computing device to carry out different types of activities throughout the day, e.g., placing phone calls, sending and receiving electronic messages, accessing the internet, and the like. In some instances, such a computing device may display visual representations of data collections. For example, a user may store photos on the computing device. The visual representation of the data collection stored on the computing device may periodically change. For example, the data collection may include data stored on the computing device and other data stored on a remotely located computing device, such as in a shared data stream on a cloud-computing device. As the data changes, either on the computing device or in the remotely located computing device, a current view of the data collection visually represented on the computing device may change (e.g., when the data collection syncs with the shared data stream).

One approach that attempts to update the visual representation of the data collection on the computing device, is to replace the current view of the data collection with a future view (e.g., a visual representation of the data collection that represents how the data collection may look after the changes to the data) of the data collection. However, such an approach may not be aesthetically pleasing and may result in an undesirable experience for the user of the computing device.

SUMMARY

Representative embodiments set forth herein disclose techniques for updating a collection view using a diffable data source.

An aspect of the disclosed embodiments is a method for updating a collection view. The method includes, at a computing device receiving a first data array corresponding to a current view of a data collection. The method also includes receiving a second data array corresponding to a future view of the data collection. The method also includes comparing a first data array element of the first data array to a second data array element of the second data array. The method also includes generating a difference data array that, based on a determination that the first data array element is equal to the second data array element, includes the second data array element. The method also includes determining, based on a determination that the first data array element does not equal the second data array element, whether the first data array element is included in the second data array. The method also includes, based on a determination that the first data array element is not included in the second data array, indicating, in the difference data array, that the first data array element is not in the future view of the data collection. The method also includes determining, based on a determination that the first data array element is not included in the second data array, whether the second data array element is included in the first data array. The method also includes, based on a determination that the second data array element is not included in the first data array, indicating, in the difference data array, that the second data array element is not in the current view of the data collection. The method also includes transitioning the data collection from the current view to the future view using the difference data array.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings, which illustrate, by way of example, the principles of the described embodiments.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
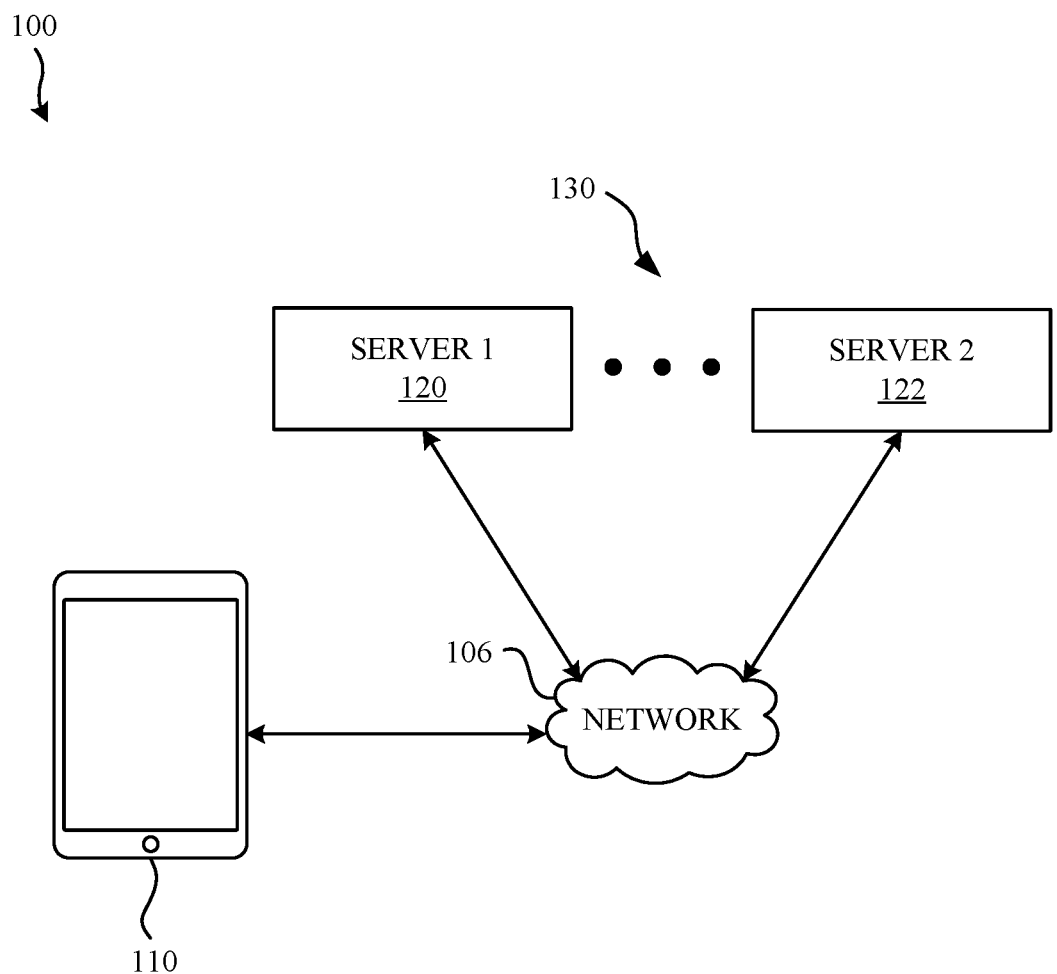
FIG. 1 illustrates an example network environment including an electronic device that may implement the subject system, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described, individuals who own and operate computing devices (e.g., smartphones and tablets) may use such computing devices in any suitable manner. Typically, an individual uses his or her computing device to carry out different types of activities throughout the day, e.g., placing phone calls, sending and receiving electronic messages, accessing the internet, and the like. In some instances, such a computing device may display visual representations of data collections. For example, a user may store photos on the computing device. The visual representation of the data collection stored on the computing device may periodically change. For example, the data collection may include data stored on the computing device and other data stored on a remotely located computing device, such as in a shared data stream on a cloud-computing device. As the data changes, either on the computing device or in the remotely located computing device, a current view of the data collection visually represented on the computing device may change (e.g., when the data collect syncs with the shared data stream).

One approach that attempts to update the visual representation of the data collection on the computing device, is to replace the current view of the data collection with a future view (e.g., a visual representation of the data collection that represents how the data collection may look after the changes to the data) of the data collection. However, such an approach may not be aesthetically pleasing and may result in an undesirable experience for the user of the computing device. In order to provide a more aesthetically pleasing and/or desirable experience for the user of the computing device, such typical computing devices may provide a transition between the current view of the data collection and the future view of the data collection using a typical diffable data source. However, such typical computing devices are incapable of generating the diffable data source in an efficient manner.

Accordingly, systems and methods, such as those described herein, that are configured to provide a transition between the current view of the data source and the future view of the data source in a manner that provides an improved experience for the user of the computing device, may be desirable. In some embodiments, the systems and methods described herein may be configured to receive data arrays corresponding to a current view and a future view of the data collection. The systems and methods described herein may be configured to compare data array elements from a first data array (e.g., corresponding to the current view of the data collection) with data array elements from a second data array (e.g., corresponding to the future view of the data collection).

In some embodiments, the systems and methods described herein may be configured to generate a difference data array that based on the comparisons of the data array elements from the first data array and the data array elements from the second data array. For example, the systems and methods described herein may indicate in the difference data array that a data array element from the second data array should appear in visual representation of the future view of the data collection when, based on a determination that a data array element from the first data array is equal to the data array element from the second data array.

In some embodiments, the systems and methods described herein may be configured to determine whether an element from the first data array is included in the second data array, when the element from the first data array is not equal to a data array element in the second data array. The systems and methods described herein may be configured to indicate in the difference data array that the element from the first data array should not appear in the visual representation of the future view of the data collection when the data array element is not found in the second data array.

In some embodiments, the systems and methods described herein may be configured to determine whether a data array element from the second data array is included in the first data array when the data array element of the first data array is not included in the second data array. The systems and methods described herein may be configured to indicate in the difference data array that the element from the second data array should appear in the visual representation of the future view of the data collection when the data array element is not found in the first data array.

In some embodiments, the systems and methods described herein may be configured to transition the visual representation of the data collection from the current view to the future view using the difference data array.

FIG. 1 illustrates an example network environment 100 including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, a server 120, and a server 122 in which the server 120 and/or the server 122 may be included in a group of servers 130. The network 106 may communicatively (directly or indirectly) couple, for example, the electronic device 110 with the server 120 and/or the server 122 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, the server 122, and the group of servers 130; however, the network environment I 00 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic system discussed below with respect to FIG. 4.

The electronic device 110 may implement the subject system to provide graphical user interfaces and animations. In one or more implementations, the electronic device 110 may include a framework that is able to support graphical user interfaces and animations, which may be provided in a particular software library in one implementation. For example, the electronic device 110 may be configured to implement a software architecture capable of executing the methods described herein.

The server 120 and/or the server 122 may be part of a network of computers or the group of servers 130, such as in a cloud computing or data center implementation. The server 120, the server 122, and/or the group of servers 130 may store data or data collections, such as photos, music, text, web pages and/or content provided therein, etc., that may be accessible on the electronic device 110. In one or more implementations, the electronic device 110 may support a UI operation that involves a representation of a data collection that is partially physically stored on the electronic device 110 and partially physically stored on the server 120, the server 122, and/or one or more servers from the group of servers 130, such as an image file, text, sound file, a video file, an application, etc. For example, the electronic device 110 may be configured to generate a visual representation of a data collection, using the UI operation. Additionally, or alternatively, the electronic device 110 may be configured to generate a visual animation of the data collection transitioning from a current view to a future view.

Figure 2:
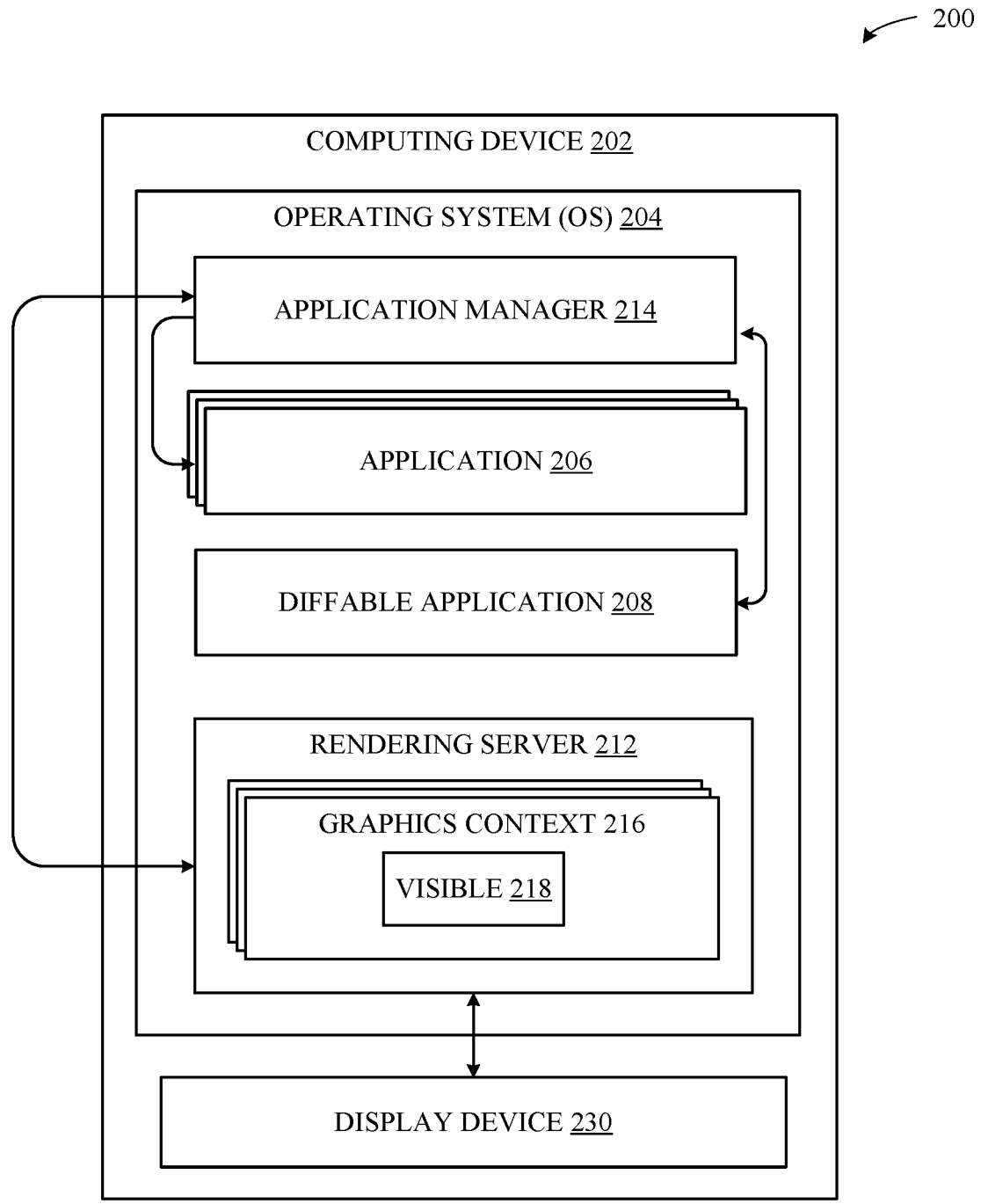
FIG. 2 illustrates a block diagram of different components of a system that is configured to implement the various techniques described herein, according to some embodiments.

FIG. 2 illustrates a block diagram of different components of a system 200 that is configured to implement the various techniques described herein, according to some embodiments. As shown in FIG. 2, a computing device 202 executes an operating system 204 that is configured to execute various applications 206, a diffable application 208, a rendering server 212, and an application manager 214. The computing device 202 may include features similar to the electronic device 110 of FIG. 1. The applications 206 can represent applications that are native to the OS 204, such as the applications that come pre-installed on the OS 204. The applications 206 can also represent third-party applications that are developed for the OS 204 and installed at a subsequent time, e.g., through an application store accessible through the OS 204.

In some embodiments, the application manager 214 represents a system kernel of the OS 204 and is configured to orchestrate the manner in which the applications 206 and/or the diffable application 208 execute on the computing device 202. Specifically, the application manager 214 is configured to launch and "kill" applications as the computing device 202 is operated by a user. This can involve, for example, initializing and launching applications when the computing device 202 is powered-on and the OS 204 is initialized, switching between applications based on user requests, and "killing" applications when appropriate.

In some embodiments, the application manager 214 is configured to generate one or more visual representations of data collections physically stored on the computing device 202, data collections physically stored on one or more remotely located computing devices (e.g., the server 120, the server 122, and the group of servers 13, or a combination thereof. For example, the user may store photos on the computing device 202 and/or may store photos or subscribe to a shared photo stream on the remotely located computing devices.

The rendering server 212 represents another system kernel of the OS 204 that is configured to render graphical content of the applications 206, data collections (e.g., as described), or a combination thereof. The rendering server 212 is configured to cause the graphical content to be displayed on the display device 230. Specifically, the rendering server 212 is configured to manage a variety of graphics contexts 216, where each graphics context 216 represents a drawing destination that is associated with an application 206 and/or a data collection. More specifically, each graphics context 216 defines basic drawing attributes such as the colors to use when drawing, a clipping area, line width and style information, font information, compositing options, and the like. This information can be maintained by the rendering server 212 so that render requests—such as UI updates—do not always need to be redundantly accompanied by information that rarely changes, thereby improving efficiency. As shown in FIG. 2, each graphics context 216 can include visible information 218, which represent attributes of the graphics context 216 whose values are set by the application manager 214 throughout the operation of the computing device 202.

The visible information 218 indicates whether the graphics context 216 is visible or invisible on the display device 230 when the graphics context 216 is rendered by the rendering server 212. In particular, the application manager 214 can be configured to indicate that a graphics context 216 of an application 206 and/or a data collection are invisible when the application manager 214 requests the rendering server 212 to obtain an up-to-date snapshot of the UI of the application 206 and/or the data collection. These snapshots provide the benefit of enabling the application manager 214 to efficiently provide to the user a visual representation of the various applications 206 and/or the various data collections that are active on the computing device 202.

The diffable application 208 is configured to generate a difference data array representing differences between a current view of a data collection being rendered on the display device 230 by the rendering server 212 and a future view of the data collection (e.g., that represents changes to the data collection from the current view). In some embodiments, the diffable application 208 is configured to receive, from the application manager 214, a first data array corresponding to the current view of the data collection and a second data array corresponding to the future view of the data collection.

In some embodiments, the diffable application 208 generates a difference data array that represents changes, that when applied to the current view of the data collection, generate the future view of the data collection. The difference data array may include only unique (e.g., no duplicate) data array elements. For example, as will be described, data array elements from the current view that are not in the future view may be indicated as being removed from the current view if the data array elements are not in the same position in the future view and data array elements from the future view may indicated as being inserted if the data array elements are the same as data array elements in the current view, but are located in a different position in the future view.

In some embodiments, the diffable application 208 is configured to compare data array elements from the first data array and the second data array in order to determine which data array elements from the first data array and the second data array should be transitioned into the future view of the data collection or out of the current view of the data collection. For example, the diffable application 208 may compare a first data array element of the first data array to a second data array element of the second data array. The diffable application 208 determines whether the first data array element is the same (e.g., is equal to) the second data array element.

When the diffable application 208 determines that the first data array element is the same as the second data array element, the diffable application 208 indicates in the difference data array that the first data array element should appear in the future view of the data collection. The indication in the difference data array may include an entry in the difference data array that represents the first data array element.

Conversely, when the diffable application 208 determines that the first data array element is not the same as the second data array element, the diffable application 208 determines whether the first data array element is included in the second data array. When the diffable application 208 determines that the first data array element is not included in the second data array, the diffable application 208 indicates, in the difference data array, that the first data array element is not in the future view of the data collection. The indication in the difference data array may include an entry in the difference data array that represents the first data array element and indicates to remove the first data array element from the current view of the data collection, when transition from the current view of the data collection to the future view of the data collection, as will be described.

In some embodiments, when the diffable application 208 determines that the first data array element is not included in the second data array, the diffable application 208 determines whether the second data array element is included in the first data array. When the diffable application 208 determines that the second data array element is not included in the first data array, the diffable application 208 is configured to indicate, in the difference data array, that the second data array element is not in the current view of the data collection. The indication may include an entry in the difference data array that represents the second array element and indicates to insert the second data array element when transition from the current view to the future view of the data collection, as will be described.

In some embodiments, when the diffable application 208 determines that the first data array element and the second data array element are not the same and when the diffable application 208 determines that the first data array element is included in the second data array, the diffable application 208 determines a difference between a location of the first data array element in the first data array and a location of the first data array element in the second data array. The diffable application 208 indicates, in the difference data array, to remove the first data array element from the current view while transition from the current view of the data collection to the future view of the data collection. Additionally, or alternatively, the diffable application 208 indicates, in the difference data array, to insert the second data array element in a position of the future view of the data collection corresponding to the difference between the location of the first data array element in the first data array and the location of the first data array element in the second data array.

In some embodiments, the computing device 202 (e.g., using application manager 214 and/or the rendering server 212) is configured to transition the visual representation of the current view of the data collection to a visual representation of the future view of the data collection, using the difference data array. For example, the computing device 202 may be configured to transition the visual representation of the data collection from the current view to the future view using the difference data by removing, from the visual representation of the current view of the data collection, data array elements in the difference data array indicated as not being in the future view of the data collection. The computing device 202 may remove the data array elements in the difference data array indicated as not being in the future view using any suitable transition animation. For example the animation may gradually fade a visual representation of a data array element being removed from the current view of the data collection, may swipe or move the data array element being removed from the current view of the data collection, or may use any other suitable animation.

In some embodiments, the computing device 202 may be configured to transition the visual representation of the data collection from the current view to the future view using the difference data by inserting, into the visual representation of the data collection, data array elements in the difference data array indicated as not being in the current view of the data collection. The computing device 202 may insert the data array elements in the difference data array indicated as not being in the current view of the data collection using any suitable transition animation. For example the animation may gradually render a visual representation of a data array element being inserted into the visual representation of the data collection, may move into place the data array element being inserted into the visual representation of the data collection, or may use any other suitable animation.

In some embodiments, the computing device 202 may generate a visual representation of the animated transition of the data collection from the current view to the future view on the display device 230.

Figure 3:
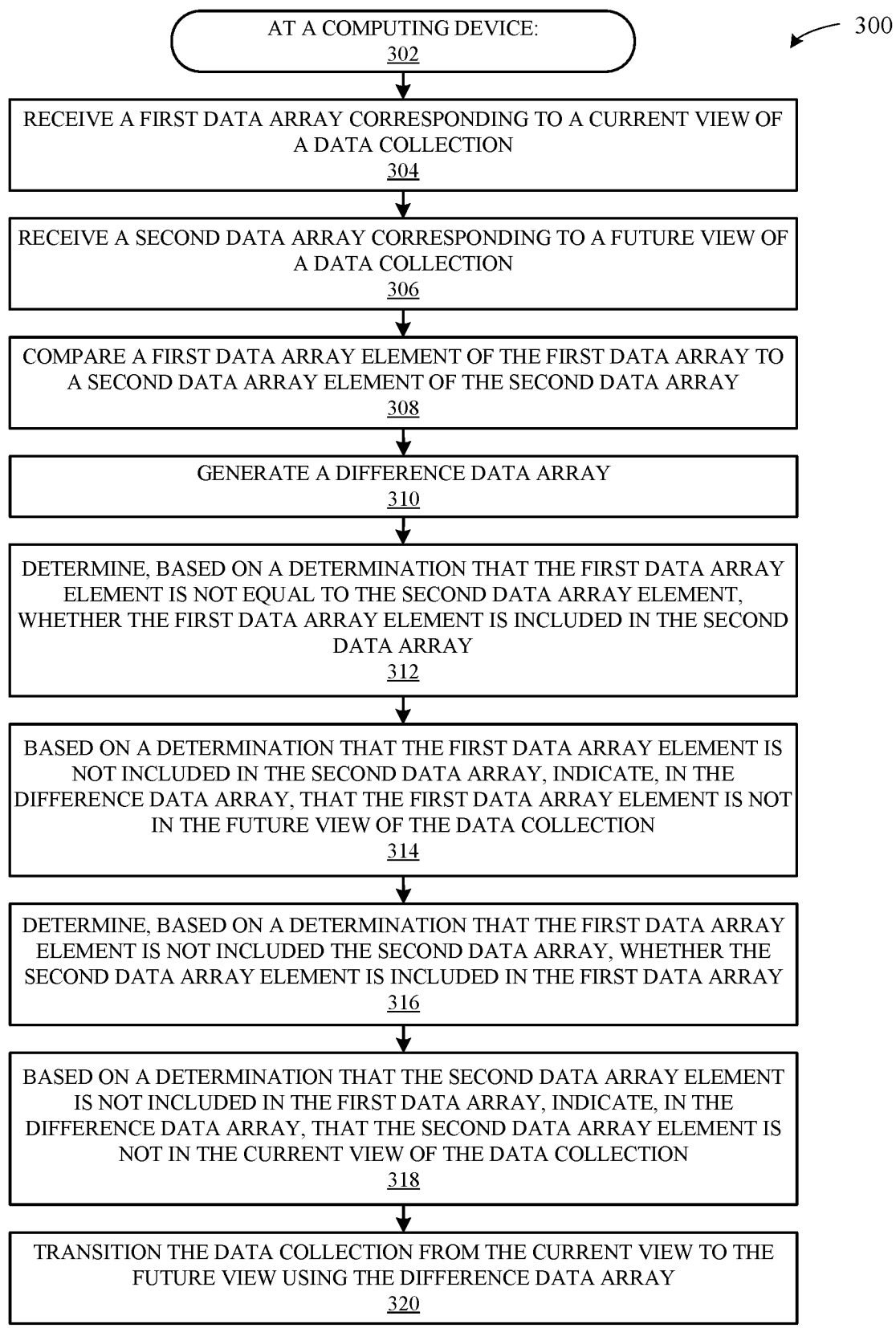
FIG. 3 illustrates a method for updating a collection view on a computing device using a diffable data source, according to some embodiments.

FIG. 3 illustrates a method 300 for updating a collection view of a computing device, according to one embodiment. As shown, the method 300 begins at step 302, where the diffable application 208 of the computing device 202 configures itself to carry out the various steps included in the method 300. Specifically, at step 304, the diffable application 208 receives the first data array corresponding to the current view of the data collection. At step 306, the diffable application 208 receives the second data array corresponding to the future view of the data collection. At step 308, the diffable application 208 compares a first data array element of the first data array to a second data array element of the second data array. At step 310, the diffable application 208 generates the difference data array. In some embodiments, the diffable application 208 indicates, in the difference data array that the second data array element is included in the future view of the data collection when the diffable application 208 determines that the first data array element is the same as the second data array element.

At step 312, the diffable application 208 determines, based on a determination that the first data array element is not equal to the second data array element, whether the first data array element is included in the second data array. At step 314, the diffable application 208, based on a determination that the first data array element is not included in the second data array, indicates, in the difference data array, that the first data array element is not in the future view of the data collection.

At step 316, the diffable application 208 determines, based on a determination that the first data array element is not included in the second data array, whether the second data array element is included in the first data array. At 318, the diffable application 208, based on a determination that the second data array element is not included in the first data array, indicates, in the difference data array, that the second data array element is not in the current view of the data collection. At step 320, the computing device 202 transitions the visual representation of the data collection from the current view to the future view using the difference data array.

Figure 4:
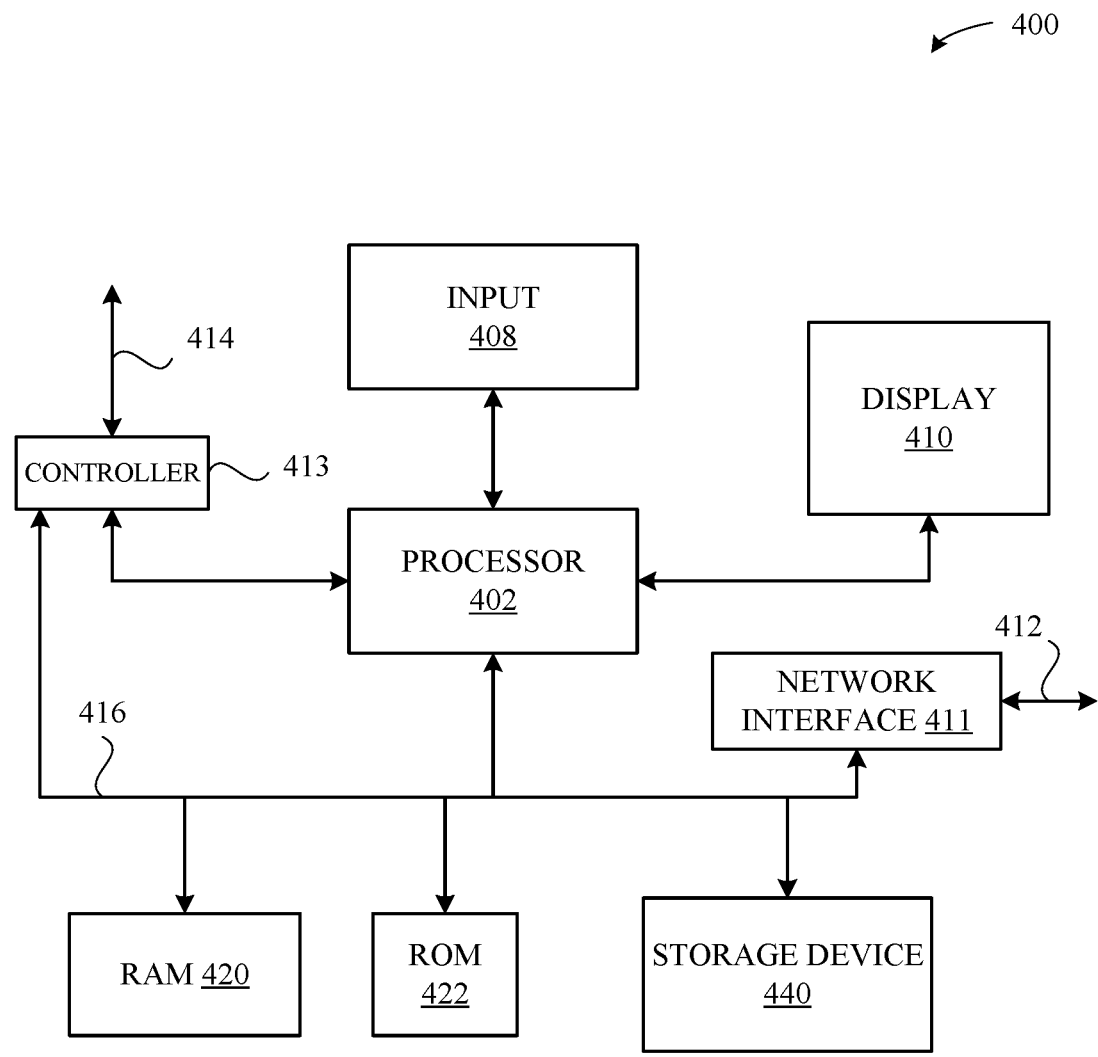
FIG. 4 illustrates a detailed view of a computing device that can be used to implement the various components described herein, according to some embodiments.

FIG. 4 illustrates a detailed view of a computing device 400 that can be used to implement the various components described herein, according to some embodiments. In particular, the detailed view illustrates various components that can be included in the computing device 102 illustrated in FIG. 1. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user. A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also includes a storage device 440, which can comprise a single disk or a plurality of disks (e.g., hard drives), and includes a storage management module that manages one or more partitions within the storage device 440. In some embodiments, storage device 440 can include flash memory, semiconductor (solid state) memory or the like. The computing device 400 can also include a Random Access Memory (RAM) 420 and a Read-Only Memory (ROM) 422. The ROM 422 can store programs, utilities, or processes to be executed in a non-volatile manner. The RAM 420 can provide volatile data storage, and stores instructions related to the operation of the computing device 102.

In some embodiments, a method for updating a collection view includes, at a computing device receiving a first data array corresponding to a current view of a data collection. The method also includes receiving a second data array corresponding to a future view of the data collection. The method also includes comparing a first data array element of the first data array to a second data array element of the second data array. The method also includes generating a difference data array that, based on a determination that the first data array element is equal to the second data array element, includes the second data array element. The method also includes determining, based on a determination that the first data array element does not equal the second data array element, whether the first data array element is included in the second data array. The method also includes, based on a determination that the first data array element is not included in the second data array, indicating, in the difference data array, that the first data array element is not in the future view of the data collection. The method also includes determining, based on a determination that the first data array element is not included in the second data array, whether the second data array element is included in the first data array. The method also includes, based on a determination that the second data array element is not included in the first data array, indicating, in the difference data array, that the second data array element is not in the current view of the data collection. The method also includes transitioning the data collection from the current view to the future view using the difference data array.

In some embodiments, the method also includes, based on the determination that the first data array element and the second data array element are not the same and based on a determination that the first data array element is included in the second data array, determining a difference between a location of the first data array element in the first data array and a location of the first data array element in the second data array. In some embodiments, the method also includes indicating, in the difference data array, to remove the first data array element or to insert the second data array element in a position corresponding to the difference between the location of the first data array element in the first data array and the location of the first data array element in the second data array. In some embodiments, transitioning the data collection from the current view to the future view using the difference data array includes removing, from a visual representation of the data collection, data array elements in the difference data array indicated as not being in the future view of the data collection. In some embodiments, transitioning the data collection from the current view to the future view using the difference data array includes inserting, into a visual representation of the data collection, data array elements in the difference data array indicated as not being in the current view of the data collection. In some embodiments, the data collection is visually represented on a display of the computing device. In some embodiments, the difference data array includes unique data array elements.

In some embodiments, at least one non-transitory computer readable medium that stores instructions that, when executed by at least one processor included in a computing device, cause the computing device to perform steps that include: receiving a first data array corresponding to a current view of a data collection; receiving a second data array corresponding to a future view of the data collection; comparing a first data array element of the first data array to a second data array element of the second data array; generating a difference data array that, based on a determination that the first data array element is equal to the second data array element, includes the second data array element; determining, based on a determination that the first data array element does not equal the second data array element, whether the first data array element is included in the second data array; based on a determination that the first data array element is not included in the second data array, indicating, in the difference data array, that the first data array element is not in the future view of the data collection; determining, based on a determination that the first data array element is not included in the second data array, whether the second data array element is included in the first data array; based on a determination that the second data array element is not included in the first data array, indicating, in the difference data array, that the second data array element is not in the current view of the data collection; and transitioning the data collection from the current view to the future view using the difference data array.

In some embodiments, the steps further include, based on the determination that the first data array element and the second data array element are not the same and based on a determination that the first data array element is included in the second data array, determining a difference between a location of the first data array element in the first data array and a location of the first data array element in the second data array. In some embodiments, the steps further include, indicating, in the difference data array, to remove the first data array element or to insert the second data array element in a position corresponding to the difference between the location of the first data array element in the first data array and the location of the first data array element in the second data array. In some embodiments, transitioning the data collection from the current view to the future view using the difference data array includes removing, from a visual representation of the data collection, data array elements in the difference data array indicated as not being in the future view of the data collection. In some embodiments, transitioning the data collection from the current view to the future view using the difference data array includes inserting, into a visual representation of the data collection, data array elements in the difference data array indicated as not being in the current view of the data collection. In some embodiments, the data collection is visually represented on a display of the computing device. In some embodiments, the difference data array includes unique data array elements.

In some embodiments, a computing device configured to update a collection view includes a display and a processor in communication with the display. The processor is configured to: receive a first data array corresponding to a current view of a data collection displayed on the display; receive a second data array corresponding to a future view of the data collection; compare a first data array element of the first data array to a second data array element of the second data array; generate a difference data array that, based on a determination that the first data array element is equal to the second data array element, includes the second data array element; determine, based on a determination that the first data array element does not equal the second data array element, whether the first data array element is included in the second data array; based on a determination that the first data array element is not included in the second data array, indicate, in the difference data array, that the first data array element is not in the future view of the data collection; determine, based on a determination that the first data array element is not included in the second data array, whether the second data array element is included in the first data array; based on a determination that the second data array element is not included in the first data array, indicate, in the difference data array, that the second data array element is not in the current view of the data collection; and transition the data collection from the current view to the future view using the difference data array, wherein the difference data array includes unique data array elements.

In some embodiments, the processor is further configured to, based on the determination that the first data array element and the second data array element are not the same and based on a determination that the first data array element is included in the second data array, determine a difference between a location of the first data array element in the first data array and a location of the first data array element in the second data array. In some embodiments, processor is further configured to, indicate, in the difference data array, to remove the first data array element or to insert the second data array element in a position corresponding to the difference between the location of the first data array element in the first data array and the location of the first data array element in the second data array. In some embodiments, the processor is further configured to transition the data collection from the current view to the future view using the difference data array by removing, from a visual representation of the data collection, data array elements in the difference data array indicated as not being in the future view of the data collection. In some embodiments, the processor is further configured to transition the data collection from the current view to the future view using the difference data array by inserting, into a visual representation of the data collection, data array elements in the difference data array indicated as not being in the current view of the data collection. In some embodiments, the processor is further configured to visually represent, on the display, an animation of the transition between the current view of the data collection and the future view of the data collection.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data, which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for displaying a visual representation of a data collection, the method comprising, at a computing device:
   obtaining first and second data arrays that correspond to current and future views of the data collection, respectively, wherein each data array includes a respective element for each item included in the respective view of the data collection;
   adding, to a difference array, indications of:
   (1) elements of the first data array that are included in the second data array,
   (2) elements of the first data array that are not included in the second data array,
   (3) elements of the second data array that are not included in the first data array, and
   (4) elements of the first data array that are included in the second data array but are located in a different position within the future view of the data collection relative to the current view of the data collection; and
   in response to receiving a request to transition from displaying the current view of the data collection to the future view of the data collection:
   applying the difference array against the future view of the data collection to identify a manner by which to visually indicate, by at least one animation, the items that are (1) kept within, (2) removed from, (3) added to, and (4) moved within the future view of the data collection relative to the current view of the data collection, and
   displaying the future view in accordance with the at least one animation.

2. The method of claim 1, wherein adding, to the difference array, indications of elements of the first data array that are included in the second data array comprises:
   establishing entries within the difference array that identify locations of items in the future view of the data collection that remain within both the current view of the data collection and the future view of the data collection.

3. The method of claim 1, wherein adding, to the difference array, indications of elements of the first data array that are not included in the second data array comprises:
   establishing entries within the difference array that identify locations of items in the future view of the data collection that are removed from the current view of the data collection relative to the future view of the data collection.

4. The method of claim 1, wherein adding, to the difference array, indications elements of the second data array that are not included in the first data array comprises:
   establishing entries within the difference array that identify locations of items in the future view of the data collection that are added to the future view of the data collection relative to the current view of the data collection.

5. The method of claim 1, wherein visually indicating, by the at least one animation, items that are removed from the current view of the data collection comprises:
   gradually fading the items.

6. The method of claim 1, wherein visually indicating, by the at least one animation, items that are added to the current view of the data collection comprises:
   gradually rendering the items.

7. The method of claim 1, wherein the current view of the data collection is displayed prior to displaying the future view in accordance with the at least one animation.

8. A non-transitory computer readable storage medium configured to store instructions that, when executed by a processor included in a computing device, cause the computing device to display a visual representation of a data collection, by carrying out steps that include:
   obtaining first and second data arrays that correspond to current and future views of the data collection, respectively, wherein each data array includes a respective element for each item included in the respective view of the data collection;
   adding, to a difference array, indications of:
   (1) elements of the first data array that are included in the second data array,
   (2) elements of the first data array that are not included in the second data array,
   (3) elements of the second data array that are not included in the first data array, and
   (4) elements of the first data array that are included in the second data array but are located in a different position within the future view of the data collection relative to the current view of the data collection; and in response to receiving a request to transition from displaying the current view of the data collection to the future view of the data collection:

applying the difference array against the future view of the data collection to identify a manner by which to visually indicate, by at least one animation, the items that are (1) kept within, (2) removed from, (3) added to, and (4) moved within the future view of the data collection relative to the current view of the data collection, and displaying the future view in accordance with the at least one animation.

9. The non-transitory computer readable storage medium of claim 8, wherein adding, to the difference array, indications of elements of the first data array that are included in the second data array comprises:

establishing entries within the difference array that identify locations of items in the future view of the data collection that remain within both the current view of the data collection and the future view of the data collection.

10. The non-transitory computer readable storage medium of claim 8, wherein adding, to the difference array, indications of elements of the first data array that are not included in the second data array comprises:

establishing entries within the difference array that identify locations of items in the future view of the data collection that are removed from the current view of the data collection relative to the future view of the data collection.

11. The non-transitory computer readable storage medium of claim 8, wherein adding, to the difference array, indications elements of the second data array that are not included in the first data array comprises:

establishing entries within the difference array that identify locations of items in the future view of the data collection that are added to the future view of the data collection relative to the current view of the data collection.

12. The non-transitory computer readable storage medium of claim 8, wherein visually indicating, by the at least one animation, items that are removed from the current view of the data collection comprises:

gradually fading the items.

13. The non-transitory computer readable storage medium of claim 8, wherein visually indicating, by the at least one animation, items that are added to the current view of the data collection comprises:

gradually rendering the items.

14. The non-transitory computer readable storage medium of claim 8, wherein the current view of the data collection is displayed prior to displaying the future view in accordance with the at least one animation.

15. A computing device configured to display a visual representation of a data collection, the computing device comprising a processor configured to cause the computing device to carry out steps that include:

obtaining first and second data arrays that correspond to current and future views of the data collection, respectively, wherein each data array includes a respective element for each item included in the respective view of the data collection;

adding, to a difference array, indications of:
(1) elements of the first data array that are included in the second data array,
(2) elements of the first data array that are not included in the second data array,
(3) elements of the second data array that are not included in the first data array, and
(4) elements of the first data array that are included in the second data array but are located in a different position within the future view of the data collection relative to the current view of the data collection; and in response to receiving a request to transition from displaying the current view of the data collection to the future view of the data collection:

applying the difference array against the future view of the data collection to identify a manner by which to visually indicate, by at least one animation, the items that are (1) kept within, (2) removed from, (3) added to, and (4) moved within the future view of the data collection relative to the current view of the data collection, and displaying the future view in accordance with the at least one animation.

16. The computing device of claim 15, wherein adding, to the difference array, indications of elements of the first data array that are included in the second data array comprises:

establishing entries within the difference array that identify locations of items in the future view of the data collection that remain within both the current view of the data collection and the future view of the data collection.

17. The computing device of claim 15, wherein adding, to the difference array, indications of elements of the first data array that are not included in the second data array comprises:

establishing entries within the difference array that identify locations of items in the future view of the data collection that are removed from the current view of the data collection relative to the future view of the data collection.

18. The computing device of claim 15, wherein adding, to the difference array, indications elements of the second data array that are not included in the first data array comprises:

establishing entries within the difference array that identify locations of items in the future view of the data collection that are added to the future view of the data collection relative to the current view of the data collection.

19. The computing device of claim 15, wherein visually indicating, by the at least one animation, items that are removed from the current view of the data collection comprises:

gradually fading the items.

20. The computing device of claim 15, wherein visually indicating, by the at least one animation, items that are added to the current view of the data collection comprises:

gradually rendering the items.

* * * * *